United States Patent [19]

Schuetz et al.

[11] Patent Number: 4,940,341
[45] Date of Patent: Jul. 10, 1990

[54] OIL-METERING COVER FOR SHAFT BEARINGS

[75] Inventors: Guenter Schuetz; Joerg Schwartz, both of Cologne, Fed. Rep. of Germany

[73] Assignee: Leybold Aktiengesellschaft, Fed. Rep. of Germany

[21] Appl. No.: 393,304

[22] Filed: Aug. 11, 1989

[30] Foreign Application Priority Data

Aug. 13, 1988 [DE] Fed. Rep. of Germany ... 8810291[U]

[51] Int. Cl.$^5$ .................... F16C 33/66; F16C 37/00; F01M 9/12
[52] U.S. Cl. .................... 384/465; 184/6.18; 384/415; 384/462; 384/474
[58] Field of Search .......... 384/462, 465, 466, 468, 384/471–473, 474, 415, 397–399, 322, 368, 385, 388, 603; 184/6.18, 50 A

[56] References Cited

U.S. PATENT DOCUMENTS

| 1,722,491 | 7/1929 | Bott et al. | |
|---|---|---|---|
| 1,963,777 | 6/1934 | Buckins . | |
| 1,991,623 | 2/1935 | Onsrud | 384/465 |
| 2,012,579 | 8/1935 | Obayashi | 384/465 |
| 2,272,757 | 2/1942 | Teker | 384/466 |
| 2,597,405 | 5/1952 | Tholl | 384/465 |
| 2,654,645 | 10/1953 | Ruist . | |
| 2,766,081 | 10/1956 | Wiedmann | 384/368 |
| 3,659,674 | 5/1972 | Ferrario | 384/415 X |
| 3,767,013 | 10/1973 | Caldwell | 384/603 X |
| 4,336,970 | 6/1982 | Burkinshaw . | |
| 4,429,924 | 2/1984 | Franz et al. | 384/462 |
| 4,541,736 | 9/1985 | Giebeler | 384/465 |
| 4,764,086 | 8/1988 | Jesinger | 384/473 X |

FOREIGN PATENT DOCUMENTS 561467 10/1932 Fed. Rep. of Germany .

OTHER PUBLICATIONS

Lubrication and Lubricating Methods for Roller Bearings by Pittroff and Betsch, 1969, No. 97.

Primary Examiner—Thomas R. Hannon

[57] ABSTRACT

A shaft (3) having a central channel (8) supplies shaft bearings (5, 6, 7) with oil. The central channel leads to an oil exit opening (9) situated in the region of a shaft bearing (2). In order to be able to supply the shaft bearing (2) with oil in metered fashion, a covering (14) is provided on the shaft bearing (5, 6, 7), with the covering (14) comprising a cylindrical section (11) that surrounds the shaft (3) in non-contacting fashion and covers the annular gap between the stationary bearing ring (7) and the rotating bearing ring (5). The cylindrical section (11) has an increased height ($h$) over a part of its circumference, and the oil exit opening is situated between the lower part (12') and the upper part (12") of the inwardly directed edge of the covering.

6 Claims, 1 Drawing Sheet

OIL-METERING COVER FOR SHAFT BEARINGS

TECHNICAL FIELD

The invention is directed to a shaft having a central channel for supplying shaft bearings with oil, with the shaft including an oil exit opening situated in the region of a shaft bearing.

BACKGROUND OF THE INVENTION

Rotary shafts are often supported in a bearing housing by two bearings. Lubricating oil for the bearings can be supplied to a supply opening in a central channel formed as a pocket bore through one end face of the shaft. Radial bores (oil exit openings) are provided through the end of the central channel, and oil proceeds through these openings and into the bearing as a consequence of centrifugal forces due to rotation of the shaft. The central channel therefore extends from the supply opening in the shaft end face at least up to the bearing most remote from the supply opening. As a rule, shafts of this type are operated while vertically oriented. The supply opening is situated at the lower end of the shaft. In some instances, oil is supplied to the central channel through the supply opening by means of an oil sump. The upper bearing of such an arrangement particularly is jeopardized by descending dirt particles.

The employment of shafts of the described type is known, for example, in turbomolecular vacuum pumps. Turbomolecular vacuum pumps are operated at extremely high speeds (40,000 revolutions per minute and more). The stresses inherent in such an extreme environment place stringent demands on the lubrication system for oil bearings. First, dirt particles must be prevented from entering into the oil stream; second, the quantity of oil supplied to the bearings must be exactly metered. In most existing systems, the quantity of oil conveyed through the central channel in the shaft to the oil exit opening is usually too great.

SUMMARY OF THE INVENTION

The object of the present invention is to provide a shaft having a central bore and at least one exit opening, wherein, first, at least the bearing remote from the oil supply opening is protected against the entry of dirt particles and, second the quantity of oil supplied to the bearing can be metered.

This and other objects are inventively achieved in that a covering is provided on the shaft bearing. The covering includes a cylindrical section having an inwardly directed edge that closely surrounds the shaft in non-contacting fashion and covers the annular gap between a stationary and a rotating bearing ring. The cylindrical section of the cover has an increased height over a part of its circumference. An oil exit opening is situated between the lower part and the upper part of the inwardly extending edge of the covering. The inwardly directed edge covers the annular gap between the stationary and the rotating bearing ring, so that the bearing is protected against penetrating dirt particles. As a consequence of the elevation of the cylindrical section over a part of its circumference, it provides an oil trap segment. The oil sprayed out of the oil exit opening, which rotates together with the shaft, proceeds into this oil trap segment and is supplied to the bearing. The remaining quantity of oil is sprayed out to the exterior of the bearing housing, thus preventing oversupply. The quantity of oil proceeding to the bearing is dependent on the circumferential extent of the oil trap segment and can thus be metered therewith.

Further advantages and details of the invention will become apparent upon reference to the accompanying description when taken in conjunction with the following drawings.

BRIEF DESCRIPTION OF THE DRAWINGS

In FIGS. 1 and 3, a bearing housing is referenced 1, an upper bearing is referenced 2, a vertical shaft is referenced 3 and a covering of the invention is referenced 4. The shaft 3 is supported in the bearing housing 1 by a rotating bearing ring 5, a rolling member 6 and a stationary bearing ring 7. The shaft includes a central channel 8 that extends from a supply opening to the level of an oil exit opening 9. This oil exit opening 9 is arranged above the upper bearing 2. The lower bearing and the fashion in which the oil proceeds from an oil sump into the oil conveying channel 8 (for example, with the assistance of a conical fashioning of the lower section of the oil conveying channel 8) are not shown in detail.

Figure 1:
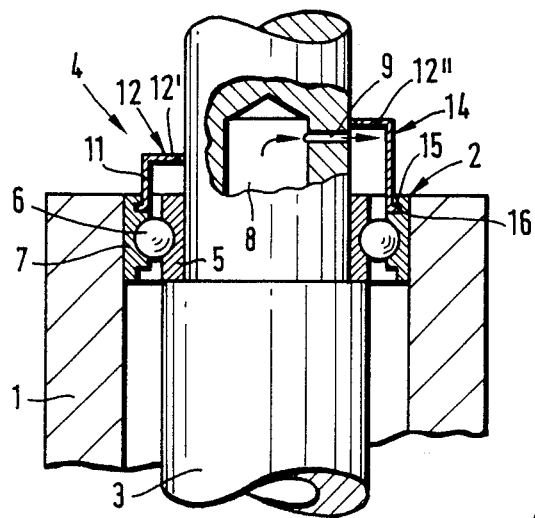
FIG. 1 is a sectional view, partially broken away, of one embodiment of the present invention.
Figure 2:
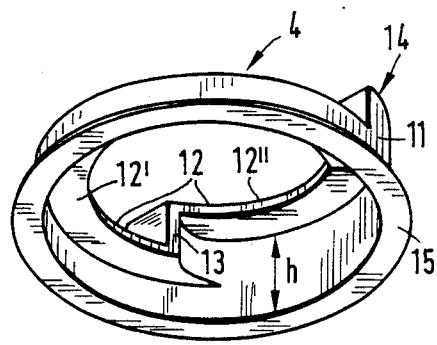
FIG. 2 is a perspective view of the embodiment of FIG. 1.
Figure 4:
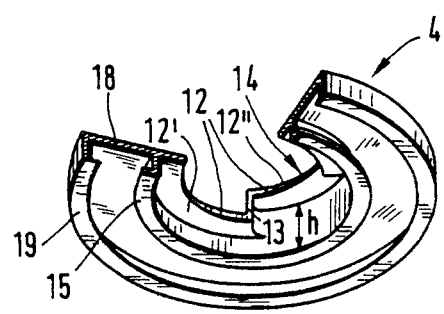
FIG. 4 is a perspective view, partially broken away, of the embodiment of FIG. 3.

The upper covering 4 includes a cylindrical section 11 that is equipped with an upper, inwardly directed edge 12. The edge 12 closely surrounds the shaft 3. The cylindrical section 11 has an increased height h over a part of its circumference (FIGS. 2 and 4). As a result, the edge 12 includes a part 12' placed lower and a part 12" placed higher. The two parts 12' and 12" are connected to one another by vertically directed sections 13. The oil exit opening 9 is arranged such that it is situated above the lower part 12' and below the upper part 12" of the edge 12.

Since the edge 12, or the edge parts 12' and 12", cover the annular gap between the stationary bearing ring 7 and the rotating bearing ring 5, the bearing is protected against penetrating dirt particles. Oil is continually sprayed out of the oil exit opening 9 that rotates together with the shaft 3. An oil trap segment 14 is formed by the upper edge 12", the vertical sections 13, and by the elevated section of the cylindrical part 11. The only oil that can enter the oil trap segment 14 is that which is sprayed while the exit opening is between the vertical sections 13 under the upper edge 12". The circumferential extent of the oil trap segment 14 is thus the decisive factor in determining how much oil proceeds to the bearing 2. The quantity of oil proceeding to the bearing 2 can therefore be metered with the assistance of the oil trap segment.

For holding the covering 4, the cylindrical section 11 is equipped with an outwardly directed edge 15 opposite the inwardly directed edge 12. The outwardly directed edge 15 engages an inwardly directed channel 16 in the stationary bearing ring 7 in the fashion of a snap ring.

Figure 3:
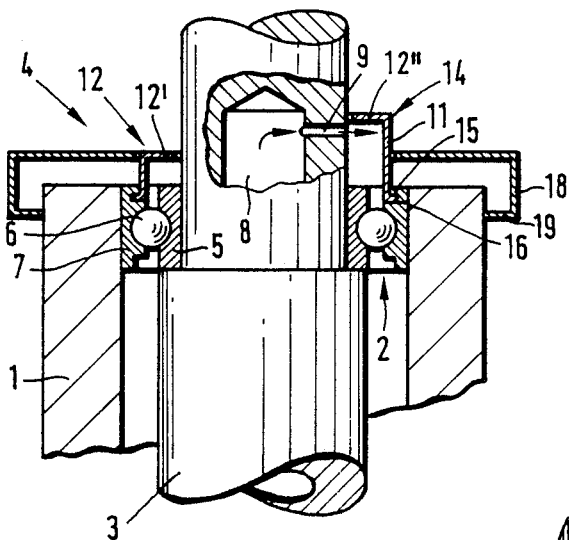
FIG. 3 is a sectional view, partially broken away, of a second embodiment of the present invention.

FIGS. 3 and 4 show an alternative for holding the covering 4. In this embodiment, the cover is equipped with a projection 18 that has an inwardly directed edge 19 surrounding the upper end of the bearing housing 1 in clamping fashion. In the exemplary embodiment of FIGS. 3 and 4, both the snap ring edge 15 as well as the projection 18 are present.

Although the invention has been set forth with reference to an exemplary embodiment comprising a vertical shaft, the covering 4 of the present invention is also useful with shafts arranged inclined and horizontally, i.e. whenever a bearing is to be protected against penetrating dirt particles or whenever it is desired to meter the amount of oil supplied to a bearing. The covering of the invention can also be applied to both bearings of a shaft.

Although the present invention has been described with reference to particular embodiments, those of skill in the art will recognize that various changes may be made therein without departing from the scope and spirit of the invention as set forth in the appended claims.

We claim:

1. In a device having a shaft comprising a central channel for supplying a shaft bearing with oil, said channel further comprising an oil exit opening disposed adjacent said shaft bearing, wherein said device is provided with a covering surrounding said shaft and comprising the following:

a cylindrical section having an inwardly directed edge that surrounds the shaft in noncontacting fashion and covers an annular gap between a stationary bearing ring and a rotating bearing ring;

wherein said cylindrical section has an increased height over a part of its circumference; and wherein said oil exit opening is situated between a lower part and an upper part of the inwardly directed edge of the covering.

2. A device according to claim 1, further wherein said cylindrical section further comprises an outwardly directed edge disposed on a side of said cylindrical section that is opposite the inwardly directed edge, said covering being secured to the stationary bearing ring in clamping fashion with said outwardly directed edge.

3. A device according to claim 2, further wherein said stationary bearing ring comprises an annular channel adapted to receive said outwardly directed edge.

4. A device according to claim 3, further wherein said covering is provided with an outer projection that is secured to, and encloses, an upper end of a housing containing said bearing.

5. A device according to claim 4, wherein said shaft is vertically oriented.

6. A device according to claim 5, further wherein said device comprises a turbo molecular vacuum pump.

* * * * *